United States Patent
Deguchi et al.

(10) Patent No.: US 9,112,391 B2
(45) Date of Patent: Aug. 18, 2015

(54) MOTOR COOLING DEVICE HAVING FLOW RATE ADJUSTING MEANS FOR A COIL END COVER

(75) Inventors: Jun-ichi Deguchi, Susono (JP); Kazuya Arakawa, Fujinomiya (JP); Kensuke Yoshizue, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 429 days.

(21) Appl. No.: 13/641,963

(22) PCT Filed: Apr. 23, 2010

(86) PCT No.: PCT/JP2010/057214
§ 371 (c)(1),
(2), (4) Date: Oct. 18, 2012

(87) PCT Pub. No.: WO2011/132305
PCT Pub. Date: Oct. 27, 2011

(65) Prior Publication Data
US 2013/0026867 A1   Jan. 31, 2013

(51) Int. Cl.
*H02K 9/19* (2006.01)
*B60L 3/00* (2006.01)
*H02K 9/197* (2006.01)
*H02K 9/193* (2006.01)
*H02K 3/24* (2006.01)
*H02K 9/22* (2006.01)

(52) U.S. Cl.
CPC ............ *H02K 9/19* (2013.01); *B60L 3/0061* (2013.01); *B60L 2240/36* (2013.01); *B60L 2240/425* (2013.01); *H02K 3/24* (2013.01);
(Continued)

(58) Field of Classification Search
CPC ........... H02K 3/24; H02K 9/19; H02K 9/193; H02K 9/197

USPC ................. 310/51, 52, 53, 54, 58, 64, 65, 260
See application file for complete search history.

(56) References Cited

U.S. PATENT DOCUMENTS 5,929,543 A *  7/1999  Zeyen et al. .................... 310/54
2005/0151429 A1  7/2005  Taketsuna et al.
(Continued)

FOREIGN PATENT DOCUMENTS

JP    10 290543    10/1998
JP    2005 323416  11/2005
(Continued)

OTHER PUBLICATIONS

International Search Report Issued Jul. 20, 2010 in PCT/JP10/57214 Filed Apr. 23, 2010.

*Primary Examiner* — Terrance Kenerly
*Assistant Examiner* — Rashad Johnson
(74) *Attorney, Agent, or Firm* — Oblon, McClelland, Maier & Neustadt, L.L.P.

(57) ABSTRACT

A motor cooling device having good cooling performance, which is adapted to promote heat transfer between a coil end and a coil end cover even if the flowing amount of oil is small. A heat of a stator is withdrawn by the oil flowing around the coil end. For this purpose, the motor cooling device comprises a flow path formed between an outer face of the coil end and an inner face of the coil end cover, and a flow rate adjusting unit for changing a cross-sectional area of the flow path by moving the coil end cover toward the coil end or away from the coil end. The flow rate adjusting unit widens the cross-sectional area of the flow path in case a feeding amount of the oil to the flow path is relatively large, and narrows the cross-sectional area of the flow path in case a feeding amount of the oil to the flow path is relatively small.

11 Claims, 5 Drawing Sheets

(52) U.S. Cl.
CPC ............... *H02K 9/193* (2013.01); *H02K 9/197* (2013.01); *H02K 9/22* (2013.01); *H02K 2213/09* (2013.01); *Y02T 10/641* (2013.01); *Y02T 10/642* (2013.01)

(56) References Cited

U.S. PATENT DOCUMENTS

2010/0045125 A1\*  2/2010  Takenaka et al. ............... 310/54
2010/0231065 A1   9/2010  Murata 2014/0070636 A1\*  3/2014  Chamberlin et al. ........... 310/54

FOREIGN PATENT DOCUMENTS

| JP | 2005 354822 | 12/2005 |
| JP | 2006 288143 | 10/2006 |
| JP | 2007 228669 | 9/2007 |
| JP | 2009 118667 | 5/2009 |
| JP | 2011-109808 | 6/2011 |
| WO | 2004 019468 | 3/2004 |

\* cited by examiner

MOTOR COOLING DEVICE HAVING FLOW RATE ADJUSTING MEANS FOR A COIL END COVER

TECHNICAL FIELD

The present invention relates to a cooling device for cooling a motor which produces heat as a result of being energized, and more particularly to a cooling device for cooing a motor by feeding heat transfer fluid between an end portion of a coil formed on a stator and a cover member covering the end portion of the coil.

BACKGROUND ART

As known in the conventional art, a motor outputs power by energizing a coil to rotate a rotor. When energizing the coil, a copper loss is caused inevitably by Joule heating, and a core loss is also caused inevitably by a change in the magnetic field resulting from rotation of the rotor. As a result, heat is produced in the motor thereby raising the temperature thereof. If the temperature of the motor is thus raised, an output, durability etc. of the motor are degraded by a degaussing or the like. Especially, the motor for driving an automobile is used under various conditions. For example, the motor used in the automobile is sometimes rotated at a low speed while generating a high torque, but sometimes rotated at a high speed while generating a low torque. Therefore, the motor used in the automobile is easily to be heated. However, since the motor of this kind is housed tightly in the limited space together with other members, the motor is difficult to be cooled naturally in the automobile.

For example, techniques for compulsory cooing an end portion of a stator coil are disclosed in an International patent Laid-Open WO/2004/019468, Japanese Patent Laid-Open No. 2009-118667, and Japanese Patent Laid-Open No. 10-290543. Specifically, International patent Laid-Open WO/2004/019468 discloses a motor comprising a coil end cover covering an end portion of the stator coil, and a supply pipe for feeding cooling oil into the coil end cover. According to the teachings of International patent Laid-Open WO/2004/019468, a cooling oil inlet is formed at a lower end of the coil end cover, and an oil pump driven by an engine is connected with the oil inlet. In addition, a cooling oil discharge outlet is formed at an upper end of the coil end cover, and an oil pan is connected with the discharge outlet. According to the motor taught by International patent Laid-Open WO/2004/019468, therefore, the cooling oil is supplied to the coil end cover by driving the oil pump by the engine, and the heat of the coil is drawn by the cooling oil flowing through the pipe while being contacted with the end portion of the coil. Then, the cooling oil is retuned from the discharge outlet to the oil pan, and supplied again to the coil end cover by the oil pump.

Japanese Patent Laid-Open No. 2009-118667 discloses a motor cooling structure in which a coil end cover covering an end portion of a stator coil is arranged between a coil end and a motor case. Therefore, the coil is cooled by supplying cooling liquid to a clearance between any of the coil end cover, the coil end and the motor case. In addition, the motor cooling structure taught by Japanese Patent Laid-Open No. 2009-118667 further comprises micro gaps into which the cooling liquid leaks. Therefore, air acting as a heat insulator is pushed out of the heat transmitting route from the coil end to the motor case by the cooling liquid flowing into the micro gap.

Japanese Patent Laid-Open No. 10-290543 discloses a motor comprising a coil end cover covering a coil end, and a spacer arranged between the coil end cover and a motor housing. According to the teachings of Japanese Patent Laid-Open No. 10-290543, heat is transmitted to the motor housing through the spacer, and the heat thus transmitted to the motor housing is further transmitted to the water in a water jacket to cool a coil.

As disclosed in International patent Laid-Open WO/2004/019468 or Japanese Patent Laid-Open No. 2009-118667, the heat of the stator coil can be drawn by supplying the cooling oil or cooling liquid around the coil end. However, as described, the motor is driven under various conditions. For example, the motor is sometimes driven at a low speed while being required to generate a high torque, but sometimes driven at a high speed while being required to generate a low torque. That is, if the cooling oil or the cooling liquid is always supplied at a constant flow rate, the cooling oil or the cooling liquid may be insufficient under the situation in which the motor is driven at a low speed while generating a high torque, and the temperature of the motor is thereby raised. To the contrary, in case the motor is driven at a high speed while generating a low torque, the cooling oil or the cooling liquid may be supplied in excessive amount and this may cause a power loss. Especially, provided that the vehicle is structured to dive the pump by a driving motor, and to supply the cooling liquid pressurized by the pump around the coil end, in case the vehicle thus structured climbs a hill, for example, the driving motor is driven at a low speed while supplying a large amount of current thereto. In this situation, a rotational speed of the pump is lowered and the flow rate or flow amount of the cooling liquid is thereby reduced, however, a heat generation amount of the motor is increased. Therefore, the motor may not be cooled sufficiently and the temperature of the motor is thereby raised in this situation.

DISCLOSURE OF THE INVENTION

The present invention has been conceived noting the above-explained technical problems, and an object of the present invention is to provide a cooling device for cooling a motor by transmitting heat property depending on a load.

According to the present invention, there is provided a motor cooling device, which is adapted to withdraw heat of a stator through fluid flowing around an end portion of a coil of the stator. In order to achieve the above-mentioned object, the cooling device of the present invention is provided with: a coil end cover that covers the end portion of the coil; a flow path for letting through heat transfer fluid, that is formed between an outer face of the coil and an inner face of the coil end cover; and a flow rate adjusting means that changes a cross-sectional area of the flow path by moving the coil end cover toward the end portion of the coil or away from the end portion of the coil. Specifically, the flow rate adjusting means is adapted to widen the cross-sectional area of the flow path in case an amount of the heat transfer fluid supplied to the flow path is relatively large, and to narrow the cross-sectional area of the flow path in case an amount of the heat transfer fluid supplied to the flow path is relatively small.

The coil end cover includes a covering member which is fitted onto the end portion of the coil while being contacted with an outer circumferential face and an inner circumferential face of the end portion of the coil. More specifically, the flow rate adjusting means is adapted to reduce a contact area between the covering member and the end portion of the coil by reducing an insertion depth of the end portion of the coil in the covering member in case the amount of the heat transfer fluid supplied to the flow path is relatively large, and to increase the contact area between the covering member and the end portion of the coil by increasing the insertion depth of the end portion of the coil in the covering member in case the amount of the heat transfer fluid supplied to the flow path is relatively small.

According to the present invention, the flow rate adjusting means includes an elastic member that pushes the coil end cover toward the end portion of the coil.

The motor cooling device of the present invention further comprises a motor housing that encases the motor. The elastic member is made of heat conductive material and interposed between the coil end cover and an inner face of the motor housing.

Specifically, the motor is installed in a vehicle, and the vehicle comprises a pump that discharges the heat transfer fluid in an amount according to a speed of the vehicle.

According to the present invention, the motor includes an in-wheel motor connected individually with a wheel of the vehicle to drive the wheel, and the pump is driven by the in-wheel motor.

According to another aspect of the present invention, the flow rate adjusting means includes a mechanism adapted to move the coil end cover in a direction away from the end portion of the coil thereby increasing the cross-sectional area of the flow path in accordance with a rotational speed of the motor.

Specifically, the above-explained mechanism is adapted to move the coil end cover away from the end portion of the coil by a centrifugal force resulting from a rotation of the motor.

According to still another aspect of the present invention, the flow rate adjusting means includes an electromagnetic force generating means that moves the coil end cover by an electromagnetic force thereby changing the cross-sectional area of the flow path.

In addition, the motor cooling device of the present invention further comprises a stator core on which the coil is formed, and a heat transfer means that connects the coil end cover with the stator core in a heat transmittable manner.

Thus, according to the present invention, the heat of the coil is drawn by the heat transfer fluid flowing through the flow path between the coil end and the coil end cover covering the coil end. In case the amount of the heat transfer fluid supplied to the flow path is small, the coil end cover is pushed by the flow rate adjusting means toward the coil, and the cross-sectional area of the flow path is thereby narrowed. In this case, therefore, the flow rate of the heat transfer fluid will not be reduced but rather increased. Consequently, thermal resistance between the coil and the coil end cover is reduced so that an amount of heat transfer is increased. To the contrary, in case large amount of the heat transfer fluid is supplied to the flow path, the coil end cover is withdrawn by the flow rate adjusting means in the direction to widen the cross-sectional area of the flow path. Consequently, resistance in the flow path is reduced so that the heat transfer fluid is allowed to flow therethrough smoothly while preventing heat generation and power loss of the motor. For these reasons, the motor can be cooled appropriately.

Specifically, in case the amount of the heat transfer fluid supplied to the flow path is small and the cross-sectional area of the flow path is thereby narrowed, the end portion of the coil is inserted deeply into the covering member of the coil end cover so that the contact area between the covering member and the end portion of the coil is increased. Therefore, the heat transfer from the oil to the coil end cover can be promoted. In other words, a large amount of heat can be radiated from the coil through the coil end cover so that the coil can be cooled appropriately. To the contrary, in case large amount of the heat transfer fluid is supplied to the flow path, the insertion depth of the end portion of the coil in the coil end cover becomes shallower. In this case, however, large amount of the heat transfer fluid is allowed to flow through the flow path. Therefore, large amount of the heat can be withdrawn from the coil by the heat transfer fluid even under the situation in which the contact area between the coil end cover and the coil end, that is, the heat transfer area is thus reduced. For this reason, the coil can be cooled appropriately.

In other words, in case large amount of the heat transfer fluid is supplied to the flow path, an internal pressure of the flow path is raised so that the coil end cover is pushed against the elastic force of the elastic member. As a result, the cross-sectional area of the flow path is widened. To the contrary, in case the amount of the heat transfer fluid supplied to the flow path is small, the internal pressure of the flow path is lowered. In this case, therefore, the coil end cover is pushed toward the coil end by the elastic force of the elastic member. As a result, the cross-sectional area of the flow path is narrowed. Thus, according to the present invention, the cross-sectional area of the flow path can be adjusted automatically in accordance with the flowing amount of the heat transfer fluid.

According to the present invention, the elastic member promotes the heat transfer between the coil end cover and the motor housing. Therefore, the heat radiation from the coil can be facilitated so that the cooling performance of the motor cooling device can be enhanced.

According to the present invention, in case the speed of the vehicle is low, a discharging amount of the heat transfer fluid is reduced. In this case, however, the cross-sectional area of the flow path formed around the coil end is narrowed. Therefore, the flow rate of the heat transfer fluid flowing through the flow path is increased or prevented to be reduced. Thus, the coil can be cooled sufficiently by thus promoting the heat radiation from the coil, even if the motor load is increased under the situation in which the vehicle is running at low speed.

In addition, according to the present invention, the in-wheel motor drives not only the wheel but also the pump. Therefore, the discharging amount of the heat transfer fluid is reduced when the speed of the pump is lowered as a result of a speed reduction of the vehicle. In this case, however, the cross-sectional area of the flow path is narrowed so that the heat radiation from the coil can be promoted to cool the motor sufficiently.

Thus, according to the present invention, the cross-sectional area of the flow path is narrowed in case the motor speed is low. In this case, therefore, the flow rate of the heat transfer fluid is increased or prevented to be reduced so that the motor can be cooled sufficiently.

According to another aspect of the present invention, the cross-sectional area of the flow path is adjusted according to the motor speed utilizing the centrifugal force resulting from the rotation of the motor. Therefore, a structure of the flow rate adjusting means can be simplified.

According to still another aspect of the present invention, the cross-sectional area of the flow path can be adjusted electrically. Therefore, the structure of the motor cooling device can be simplified and the cross-sectional area of the flow path can be controlled flexibly.

In addition, according to the present invention, the heat of the coil formed on the stator can be radiated not only from the coil but also from the stator core through the coil end cover. Therefore, the cooling performance of the motor cooling device can be enhanced.

BEST MODE FOR CARRYING OUT THE INVENTION

Figure 9:
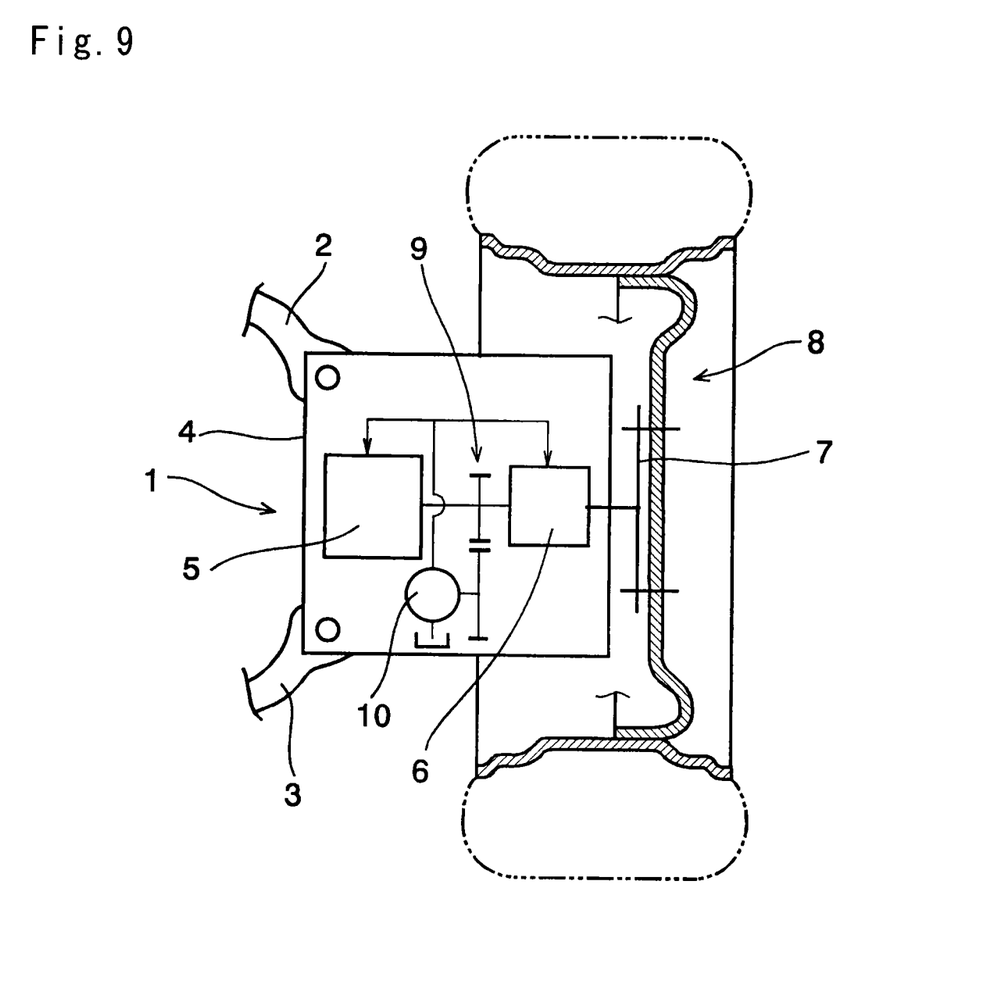
FIG. 9 is a view schematically showing one example of the in-wheel motor to which the present invention is applied.

Next, the present invention will be explained in more detail. The present invention can be applied to a motor used as a prime mover of industrial machineries, or used as a prime mover of automobiles. The motors of those kinds are adapted to output torque by energizing a coil to rotate a rotor, and heated due to iron loss and core loss. The motor used as a prime mover of an automobile includes a motor generator used in a hybrid system, and an in-wheel motor connected individually with a wheel to drive the wheel. FIG. 9 shows an example of an in-wheel motor 1. As shown in FIG. 9, a motor 5 is fixedly housed in a motor housing 4, and the motor housing 4 is held by an upper arm 2 and a lower arm 3. A permanent magnet type synchronous motor is the most suitable motor to be used as the motor 5. However, other kinds of conventional motors such as an induction motor may also be used as the motor 5.

A speed reducer or a transmission (transmission hereinafter) 6 is connected with an output side of the motor 5 so that the output torque of the motor 5 is varied by the transmission 6. An output shaft of the transmission 6 protrudes from the motor housing 4 to be connected with a wheel 8 through a hub 7. Meanwhile, an output shaft of the motor 5 is connected with a pump 10 through a gear unit 9. The pump 10 is adapted to discharge oil serving as a heat transfer fluid while pressurizing, and an oil passage is formed in a manner to feed the oil discharged from the pump 10 to both motor 5 and the transmission 6.

Figure 1:
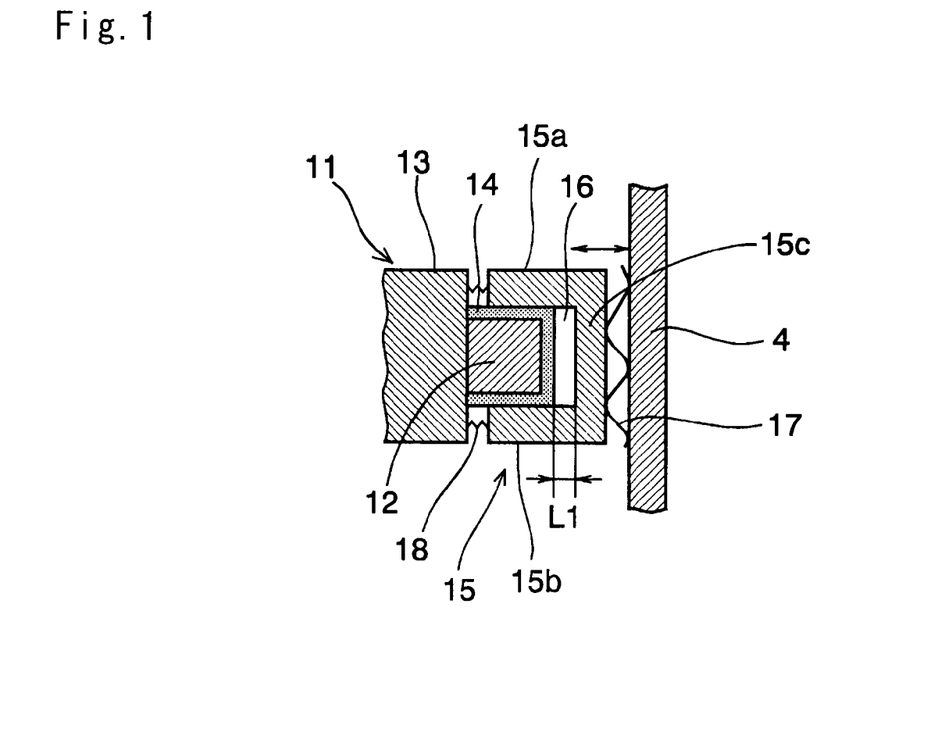
FIG. 1 is a partial sectional view showing one example of the present invention.

The oil thus supplied to the motor 5 is partially used to cool the motor 5. FIG. 1 schematically shows an example of a cooling structure of the motor 5, and according to the example shown therein, an end portion of a coil (coil end hereinafter) 12 of a stator 11 is cooled compulsory. Specifically, the stator 11 is composed mainly of a stator core 13 formed by laminating magnetic steel sheets and a coil (not shown), and the coil end 12 protrudes from an end portion of the stator core 13 in an axial direction. In order to maintain the formation of the coil end 12, and in order to protect wires forming the coil end 12, the coil end 12 is coated with a resin coating 14.

In the stator 11, a plurality of the coil ends 12 are situated at regular intervals in a circumferential direction of the stator core 13, and those coil ends 12 are covered together by an annular coil end cover 15. Specifically, the coil end cover 15 comprises: an outer circumferential wall 15a contacted with an outer circumference of the coil end 12; an inner circumferential wall 15b contacted with an inner circumference of the coil end 12; and a side wall 15c connecting the outer circumferential wall 15a and the inner circumferential wall 15b at a leading end side of the coil end 12. Thus, a hollow space is crated in the coil end cover 15 by the outer circumferential wall 15a, the inner circumferential wall 15b and the side wall 15c, and the coil end 12 is fitted into the hollow space of the coil end cover 15.

Widths of an inner face of the outer circumferential wall 15a and an inner face of the inner circumferential wall 15b are longer than a protruding length of the coil end 12 so that a depth of the hollow space is deeper than the protruding length of the coil end 12. Therefore, a flow path 16 is created between an inner face of the coil end cover 15 and a leading end face of the coil end 12 after inserting the coil end 12 into the hollow space of the coil end cover 15. Thus, the oil discharged from the pump 10 is allowed to flow through the flow path 16 to serve as the heat transfer fluid. For this purpose, the flow path 16 is connected with a suction inlet (not shown) of the pump 10 at a predetermined portion, or closed to a draining portion.

The coil end cover 15 is used not only to form the flow path 16 for running the oil therethrough but also to expedite a heat radiation from the coil end 12. Therefore, the coil end 12 is preferably formed using material having good heat conductivity. In order to suppress temperature rise in the coil end 12 by receiving a heat as much as possible by the coil end cover 15 at an initial phase of temperature rise in the coil end 12, the coil end cover 15 is preferably structured to increase a heat capacity thereof. For this purpose, material having a large specific heat capacity is preferably used to form the coil end cover 15, and the coil end cover 15 is preferably formed in a manner to have a large mass.

The coil end 12 is situated close to the inner face of the motor housing 4 while being opposed thereto, and as described, the coil end cover 15 is fitted onto the coil end 12. Between the coil end cover 15 and the inner face of the motor housing 4, there is interposed an elastic member 17 functioning as a flow rate adjusting means of the present invention. The elastic member 17 includes a wave spring, a diaphragm spring etc., and the elastic member 17 is used to push the coil end cover 15 toward the coil (i.e., toward the stator core 13) against a pressure of the oil flowing through the flow path 1. Therefore, a balance between the pressure of the oil in the flow path 16 and an elastic force of the elastic member 17 is kept in a manner to keep a width (i.e., a cross-section) of the flow path 16 to a predetermined width L1. The elastic member 17 is thus contacted with both of the coil end cover 15 and the motor housing 4 to transmit the heat therebetween. For this purpose, the elastic member 17 is preferably formed using a material having good heat conductivity.

Figure 2:
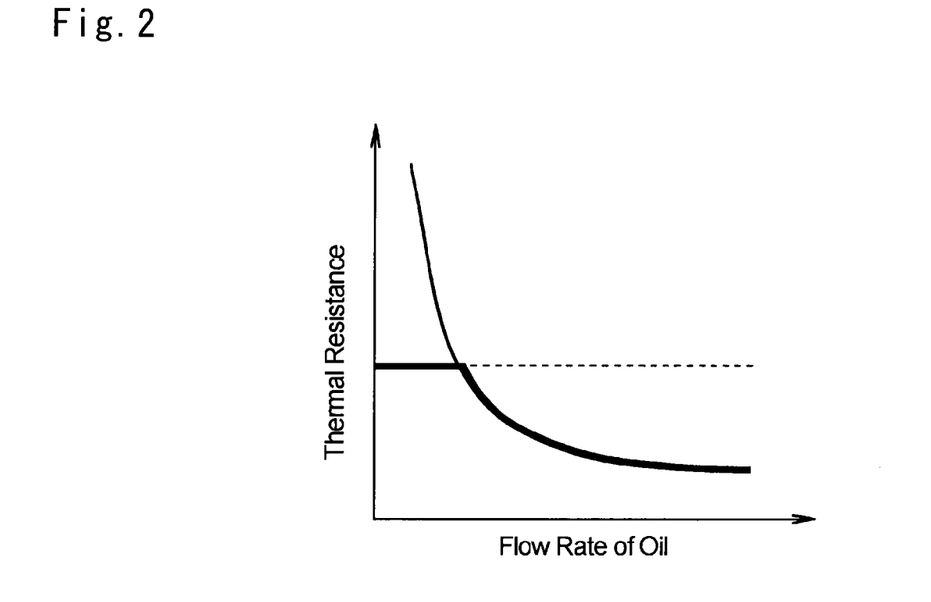
FIG. 2 is a graph indicating a relation between the flow rate of the oil and the thermal resistance.

Here will be explained a relation between a flow rate of the oil flowing through the flow path 16, and a thermal resistance or a heat conductivity. For example, the thermal resistance between the coil end 12 and the coil end cover 15 is reduced with an increase in the flow rate of the oil flowing through the flow path 16. In a graph shown in FIG. 2, a curved line indicates a general tendency of the thermal resistance between the coil end 12 and the coil end cover 15 through the oil. It is assumed that the tendency shown therein is achieved by the fact that the oil is stirred as a result of flowage itself. That is, the heat is transferred not only by heat conduction but also by a flowage of the oil. In the example shown in FIG. 1, the coil end cover 15 is partially contacted with the coil end 12 so that the heat is also transmitted directly therebetween. In FIG. 2, the broken line indicates a thermal resistance at the contact portion between the coil end cover 15 and the coil end 12. As described, the thermal resistance between the coil end 12 and the coil end cover 15 through the oil is increased with a reduction in the flow rate of the oil. Therefore, the thermal resistance between the coil end 12 and the coil end cover through the oil is larger than the thermal resistance at the contact portion between the coil end cover 15 and the coil end 12 within the range where the flow rate of the oil is slower than a predetermined speed. Specifically, in the example shown in FIG. 1, the substantial thermal resistance between the coil end 12 and the coil end cover 15 can be expressed as the thick line in FIG. 2. That is, in order to maintain a cooling effect of the oil flowing through the flow path 16 irrespective of the flowing amount, it is necessary to keep the flow rate of the oil higher than the predetermined speed.

Figure 3:
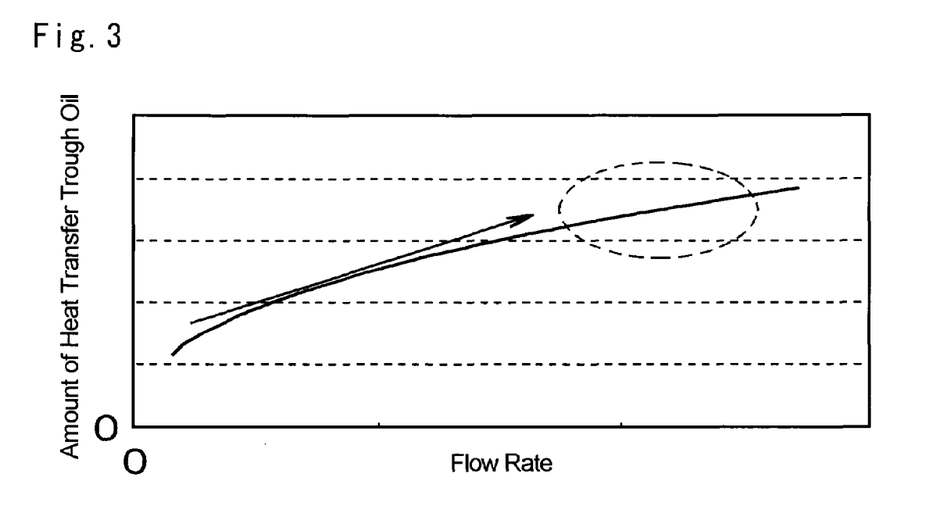
FIG. 3 is a graph indicating a relation between the flow rate of the oil and the heat transfer amount.

FIG. 3 is a graph indicating one example of a measurement result of the heat transfer between the coil end 12 and the coil end cover 15 through the oil. As described, in the vehicle having the in-wheel motor 1, the pump 10 is driven by the pump 10. Therefore, the flow rate of the oil indicated in in FIG. 3 is substantially in proportional to the vehicle speed. That is, as can be seen from data indicated in FIG. 3, an amount of heat transfer through the oil is small in the low speed region. This means that the cooling performance is degraded in the low speed region. In FIG. 3, an area enclosed by a broken line is the amount of heat transfer under the situation in which the vehicle cruises at a medium to high speed. However, it is expected that the motor load is increased at the low speed region. Therefore, it is preferable to keep the flow rate of the oil within the region enclosed by the broken line in FIG. 3 even in case the vehicle runs at low speed.

As described, the elastic force of the elastic member 17 is applied to the coil end cover 15 to push the coil end cover 15 against the pressure of the oil flowing through the flow path 16. Therefore, in case the vehicle is running at low speed so that an oil discharging amount of the pump 10 is relatively small, the oil pressure in the flow path 16 is lowered and the coil end cover 15 is thereby pushed toward the coil. When the width L1 of the flow path 16 (i.e., the cross section of the flow path 16) is thus narrowed, the flow rate of the oil flowing therethrough is increased and an internal pressure of the flow path 16 is raised. In this situation, the coil end cover 15 is situated at the position where the internal pressure of the flow path 16 and the elastic force of the elastic member 17 are balanced. According to the present invention, the elastic force of the elastic member 17 is adjusted to keep the flow rate of the oil flowing through the flow path 16 within the range enclosed by the broken line even if the width L1 of the flow path 16 (i.e., the cross section of the flow path 16) is thus changed. However, if the spring force is increased more than necessary, the flow rate of the oil flowing through the flow path 16 is increased excessively. In this case, the cooling performance of the oil reaches the performance limit, therefore, the amount of the heat transfer will not be increased any more. In addition, the resistance in the flow path 16 is increased thereby causing a power loss. Further, a cost of the cooling device has to be increased to arrange the spring having a larger spring force as the elastic member 17, and such spring having a larger spring force is difficult to be arranged in the cooling device.

As a result of activating the motor 5, the temperature is raised entirely in the stator 11 including the coil. However, the heat thus generated in the stator 11 is radiated to outside through the coil end cover 15 and the motor housing 4. For this purpose, in the cooling device shown in FIG. 1, a heat transfer member 18 is interposed between the stator core 13 and the oil end cover 15 to transmit the heat therebetween. In other words, the stator core 13 is always connected with the oil end cover 15 through the heat transfer member 18 even under the situation in which the coil end cover 15 is reciprocated laterally in FIG. 1. For this purpose, the heat transfer member 18 is preferably made of flexible material. Alternatively, the heat transfer member 18 may also be connected to one of the stator core 13 and the coil end cover 15 in a fixed manner and connected to the other one in a slidable manner. In the example shown in FIG. 1, a coil spring is used as the heat transfer member 18. In addition, in case of thus interposing the heat transfer member 18 between an end face of the stator core 13 and an end face of the coil end cover 15, it is preferable to insert at least one of the end portions of the heat transfer member 18 into a recessed portion formed on the stator core 13 or the coil end cover 15. In case one of the end portions of the heat transfer member 18 is thus fitted into the recess of the stator core 13 or the coil end cover 15, the heat transfer member 18 is allowed to be further pushed into the recess when the coil end cover 15 comes closest to the stator core 13. In this situation, therefore, the end face of the coil end cover 15 is allowed to be contacted directly with the stator core 13 so that the air forming a heat insulating layer is pushed out from the clearance between the stator core 13 and the coil end cover 15 to enhance heat transfer therebetween.

Next, an action of the cooling device thus structured will be explained hereinafter. When the motor 5 is rotated to drive the vehicle, the pump 10 connected with the output shaft of the motor 5 through the gear unit 9 is driven so that the oil is discharged therefrom and supplied to the flow path 16. In case the vehicle is running at low speed, an oil discharging amount of the pump 10 is small. In this case, therefore, the coil end cover 15 is pushed by the elastic member 17 toward the coil, and the width L1 (i.e., the cross section) of the flow path 16 is thereby narrowed. In other words, the coil end cover 15 is moved in the direction to reduce the cross section of the flow path 16 at the point where the oil pressure in the flow path 16 and the elastic force of the elastic member 17 are balanced. Thus, the flow rate of the oil flowing through the flow path 16 is kept to be as fast as the designed speed even in case the oil discharging amount of the pump 10 is relatively small. That is, as explained with reference to FIG. 3, the thermal resistance between the coil end 12 and the coil end cover 15 is relatively small so that the heat transfer amount therebetween can be maintained to that of the case in which the vehicle runs at medium to high speed.

As described, the coil end 12 is inserted deeply into the coil end cover 15 when the coil end cover 15 is pushed toward the coil. In this situation, a contact area between the coil end 12 and the coil end cover 15, that is, a heat transmittable area is enlarged so that the direct heat transfer without interposing the oil therebetween is enhanced.

The heat thus transmitted to the coil end cover 15 is partially transmitted to the motor housing 4 through the elastic member 17, and the remaining heat is dissipated inside of the coil end cover 15 and then transmitted to the motor housing 4. As a result, the heat of the motor 5 is radiated into the atmosphere from the motor housing 4 and the motor 5 is thereby cooled. In case the heat transfer member 18 is interposed between the stator core 13 and the coil end cover 15, the heat is transmitted from the stator core 13 to the coil end cover 15 to be radiated from the motor housing 4. In this case, therefore, the stator core 13 is further cooled.

To the contrary, in case the vehicle is running at high speed so that the oil discharging amount of the pump 10 is relatively large, the coil end cover 15 is pushed back toward the motor housing 4 by the pressure of the oil flowing through the flow path 16, and the width L1 (i.e., the cross section) of the flow path 16 is thereby widened. Therefore, the resistance in the flow path 16 will not be increased so that an occurrence of power loss can be prevented. In this case, the flow rate of the oil flowing through the flow path 16 is increased so that the amount of heat transfer from the coil end 12 to the coil end cover 15 through the oil can be increased to radiate the heat effectively from the motor 5.

Here will be explained a situation where the motor load is increased under the condition in which the vehicle runs at relatively low speed. In case the vehicle is running at low speed, the coil end cover 15 is moved toward the coil to reduce the cross sectional area of the flow path 16. In this situation, the coil end 12 is inserted deeply into the coil end cover 15 so that the contact area therebetween is increased. In addition, the end face of the coil end cover 15 may be contacted with the end face of the stator core 13. When the motor load (i.e., an amount of the current) is increased in this situation, a heat generation of the motor 5 is increased due to copper loss. In this situation, however, the cross sectional area of the flow path 16 is reduced so that the flow rate of the oil flowing therethrough is increased. Therefore, the heat is transmitted from the coil end 12 promptly to coil end cover 15 by the oil. In addition, the contact area between the coil end 12 and the coil end cover 15 is enlarged so that large amount of heat can be transmitted to the coil end cover 15. Further, if the coil end cover 15 is contacted directly with the end face of the stator core 13 in this situation, a large amount of the heat can be transmitted from the stator core 13 to the coil end cover 15. For these reasons, the heat of the stator core 13 can be transmitted to the coil end cover 15 to withdraw the heat from the motor 5 effectively even under the situation in which the vehicle runs at low speed and the flowing amount of the oil is small. In addition, temperature rise of the motor 5 can be further suppressed by forming the coil end cover 15 in a manner to increase thermal capacity thereby accepting the heat from the motor 5.

Figure 4:
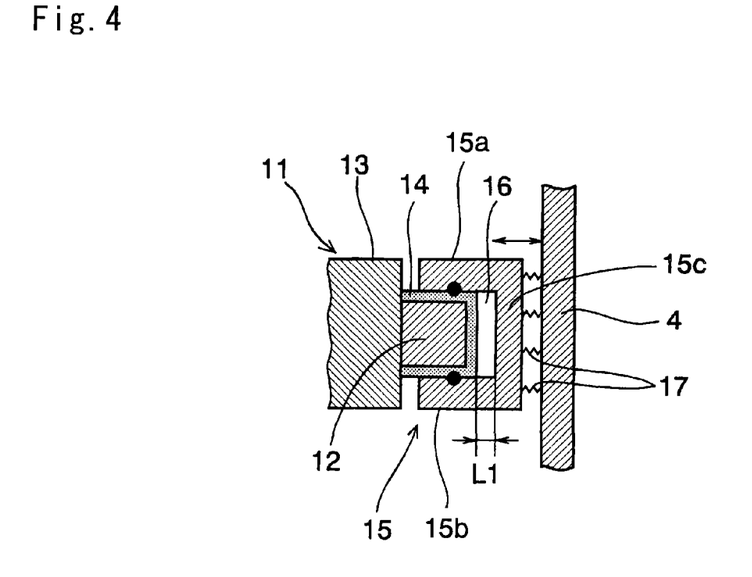
FIG. 4 is a partial sectional view showing another example of the present invention.

The present invention should not be limited to the structure shown in FIG. 1. Modified examples of the present invention will be explained hereinafter. For example, as shown in FIG. 4, a coil spring can be used as the elastic member 17 for pushing the coil end cover 15 toward the coil instead of the wave spring or the diaphragm spring. In addition, the heat transfer member 18 arranged between the stator core 13 and the coil end cover 15 may be omitted.

Figure 5:
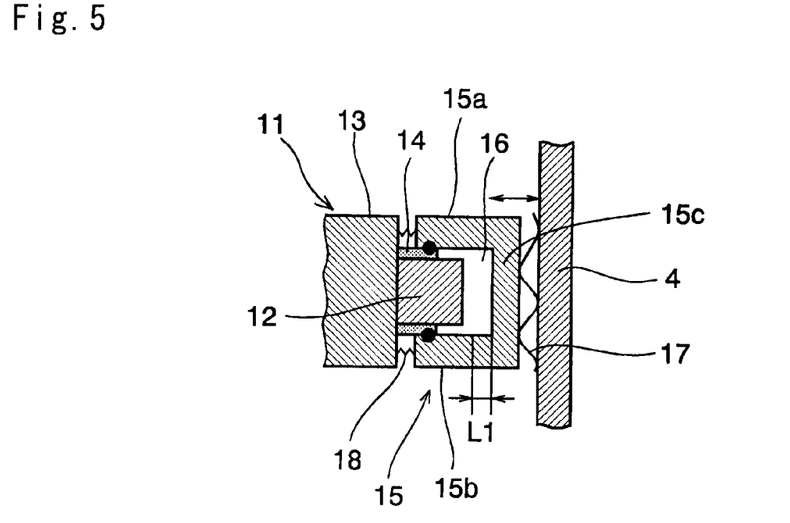
FIG. 5 is a partial sectional view showing an example in which the coil end is exposed in the flow path.

A leading end portion of the coil end 12 (i.e., the portion of the flow path 16 side) is covered by the oil end cover 15 in a manner not to exposed to outside. Therefore, as shown in FIG. 5, the leading end portion of the coil end 12 may be contacted directly with the oil flowing through the flow path 16 without arranging the resin coating 14 thereon.

Figure 6:
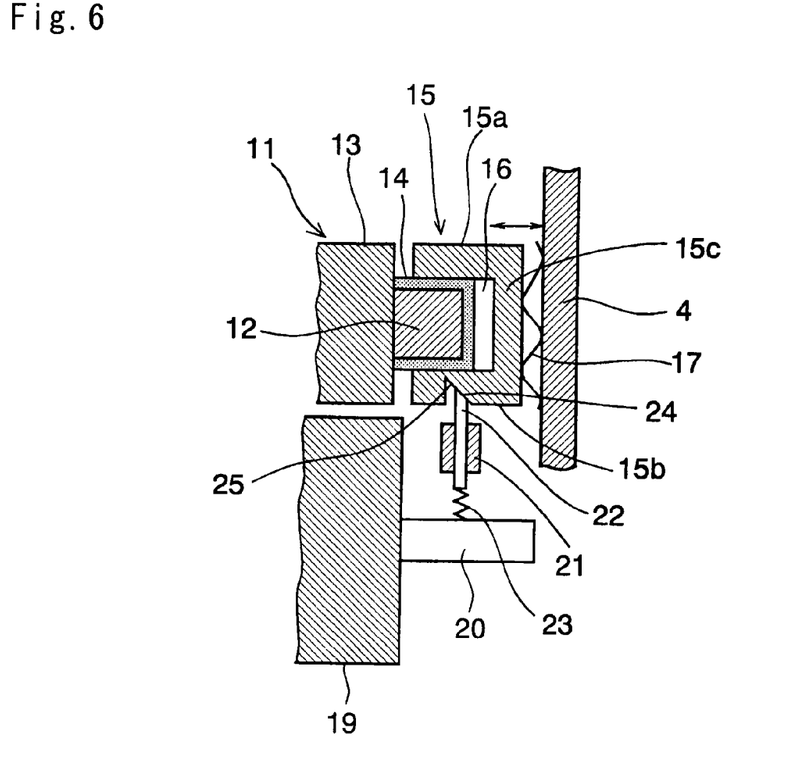
FIG. 6 is a partial sectional view showing an example of changing the cross-sectional area of the flow path utilizing a centrifugal force.

In addition, a mechanism utilizing a centrifugal force or an electromagnetic force may also be used as the flow rate adjusting means instead of the elastic member 17. FIG. 6 shows an example for moving the coil end cover 15 in the axial direction by the centrifugal force. According to the example shown in FIG. 6, a mass 22 is arranged in an outer circumferential side of a rotor shaft 20 protruding integrally from a rotor 19, in a manner to slide in a radial direction along a guide 21. For this purpose, the mass 22 is connected with the rotor shaft 20 via a return spring 23. Specifically, according to the example shown in FIG. 6, the mass 22 is rotated together with the rotor shaft 20 and centrifugally displaced radially outwardly to a place at which the centrifugal force and an elastic force of the return spring 23 pulling the mass 22 are balanced. As shown in FIG. 6, a tapered face 24 is formed on an outer circumferential edge of the mass 22, and a tapered face 25 is formed on an inner circumferential face of the coil end cover 15 to be contacted with the tapered face 24 in a slidable manner. Those tapered faces 24 and 25 are inclined toward the rotor 19, that is, toward the stator core 13, therefore, a distance from a center axis of the rotor shaft 20 to those tapered faces 24 and 25 is longest at the rotor 19 or the stator core 13 side, and shortest at the motor housing 4 side (that is, a shaft end side of the motor 5). Thus, the centrifugal force acting on the mass 22 is converted into a thrust force acting in the axial direction by the tapered faces 24 and 25, and the coil end cover 15 is moved backwardly toward the motor housing 4 against the elastic force of the elastic member 17 by the thrust force thus converted from the centrifugal force. For this purpose, according to the example shown in FIG. 6, the elastic force of the elastic member 17 is set to counteract the above-explained centrifugal force. Here, the above-explained the heat transfer member is not arranged in the example shown in FIG. 6.

According to the example shown in FIG. 6, in case the vehicle is running at low speed so that the oil discharging amount of the pump 10 is small, the rotor 19 is rotated at low speed and the centrifugal force applied to the mass 22 is small. Therefore, the coil end cover 15 is pushed toward the coil by the elastic member 17 so that the cross sectional area of the flow path 16 is reduced. As a result, the flow rate of the oil flowing through the flow path 16 is increased so that the heat of the coil end 12 can be transmitted promptly to the coil end cover 15. Thus, the motor 5 can be cooled sufficiently even if the oil discharging amount of the pump 10 is small. To the contrary, in case the rotor 19 is rotated at high speed, the centrifugal force acting on the mass 22 is increased so that the coil end cover 15 is pushed backwardly toward the motor housing 4. In this case, therefore, the cross-sectional area of the flow path 16 is enlarged and the resistance in the flow path 16 is reduced.

Figure 7:
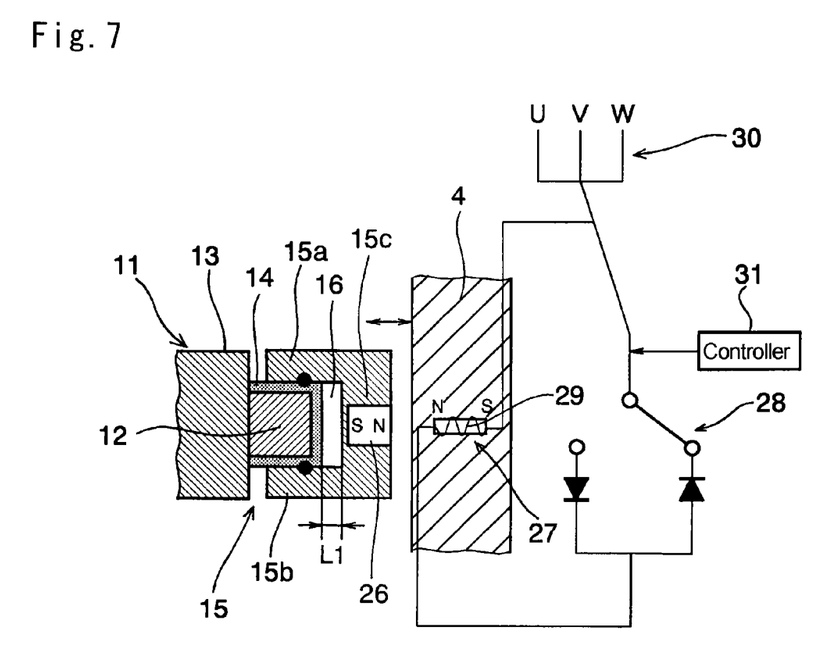
FIG. 7 is a partial sectional view showing an example of changing the cross-sectional area of the flow path electrically.
Figure 8:
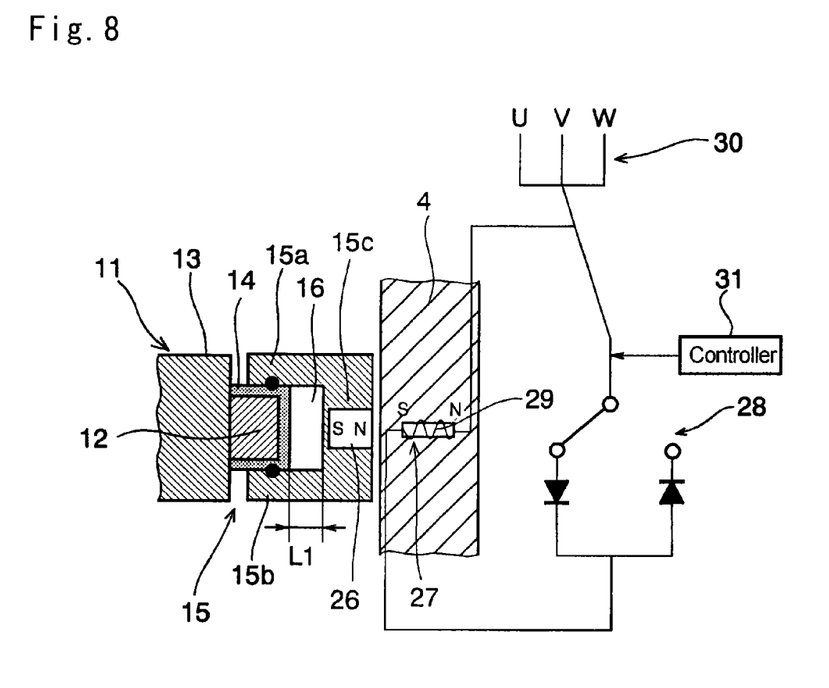
FIG. 8 is a partial sectional view schematically showing a situation in which the flowing amount of the oil is large.

Still another example of the flow rate adjusting means is shown in FIGS. 7 and 8. According to the example shown therein, the position of the coil end cover 15, that is, the cross-sectional area of the flow path 16 is changed by a magnetic force. For this purpose, a permanent magnet 26 is arranged in the coil end cover 15 in a manner to orient one of the poles (e.g., a North pole) to the inner face of the motor housing 4, and an electric magnet 27 is arranged in the motor housing 4 while being opposed to the permanent magnet 26. A coil 29 is wrapped around the electric magnet 27, and a direction of a current travelling through the coil 29 is switched by a switch 28. In addition, this example is provided with a power source 30, and a direction of a current from the power source 30 is switched by a command signal from a controller 31.

According to the example shown in FIGS. 7 and 8, in case the vehicle is running at low speed, the current is applied to the electric magnet 27 in a manner to switch the polarity of the magnetic pole being opposed to the permanent magnet 26 to be identical to that of the magnetic pole of the permanent magnet 26 being opposed to the electric magnet 27. Consequently, the electric magnet 27 and the permanent magnet 26 repel each other so that the coil end cover 15 is pushed toward the coil and the cross-sectional area of the flow path 16 is thereby narrowed. Thus, even in case the oil discharging amount of the pump 10 is small, a large amount of heat can be transmitted from the coil end 12 to the coil end cover 15 to withdraw the heat effectively from the motor 5 by increasing the flow rate of the oil flowing through the flow path 16. As the above-explained examples, the coil end 12 is inserted deeply into the coil end cover 15 in this situation so that the contact area between the coil end 12 and the coil end cover 15 is enlarged. Therefore, the amount of heat transfer from the coil end 12 to the coil end cover 15 is further increased.

To the contrary, in case the vehicle is running at medium to high speed, the current is applied to the electric magnet 27 in a manner to switch the polarity of the magnetic pole being opposed to the permanent magnet 26 to be different from that of the magnetic pole of the permanent magnet 26 being opposed to the electric magnet 27. Consequently, the electric magnet 27 and the permanent magnet 26 are attracted to each other by a magnet force so that the coil end cover 15 is pulled toward the motor housing 4 and the cross-sectional area of the flow path 16 is thereby widened. Therefore, the resistance in the flow path 16 can be reduced even in case the oil discharging amount of the pump 10 is large. In addition, as the above-explained examples, the flow rate and the flowing amount of the oil can be increased so that the heat of the motor 5 can be withdrawn effectively.

The invention claimed is:

1. A motor cooling device, which is adapted to withdraw heat of a stator through fluid flowing around an end portion of a coil of the stator, comprising:
    a coil end cover that covers the end portion of the coil;
    a flow path for letting through heat transfer fluid, that is formed between an outer face of an end portion of the coil and an inner face of the coil end cover; and
    a flow rate adjusting means that changes a cross-sectional area of the flow path by moving the coil end cover toward the end portion of the coil or away from the end portion of the coil;
    wherein the flow rate adjusting means widens the cross-sectional area of the flow path with an increment of the heat transfer fluid supplied to the flow path, and narrows the cross-sectional area of the flow path with a reduction of the heat transfer fluid supplied to the flow path.

2. The motor cooling device as claimed in claim 1, wherein:
    the coil end cover includes a covering member which is fitted onto the end portion of the coil while being contacted with an outer circumferential face and an inner circumferential face of the end portion of the coil; and
    the flow rate adjusting means reduces a contact area between the covering member and the end portion of the coil by reducing an insertion depth of the end portion of the coil in the covering member with the increment of the heat transfer fluid supplied to the flow path, and increases the contact area between the covering member and the end portion of the coil by increasing the insertion depth of the end portion of the coil in the covering member the reduction of the heat transfer fluid supplied to the flow path.

3. The motor cooling device as claimed in claim 1, wherein the flow rate adjusting means includes an elastic member that pushes the coil end cover toward the end portion of the coil.

4. The motor cooling device as claimed in claim 3, further comprising:
    a motor housing that encases the motor; and
    wherein the elastic member is made of heat conductive material, and interposed between the coil end cover and an inner face of the motor housing.

5. The motor cooling device as claimed in claim 1, wherein:
    the motor is installed in a vehicle; and
    the vehicle comprises a pump that discharges the heat transfer fluid in an amount according to a speed of the vehicle.

6. The motor cooling device as claimed in claim 5, wherein:
    the motor includes an in-wheel motor connected individually with a wheel of the vehicle to drive the wheel; and
    the pump is driven by the in-wheel motor.

7. The motor cooling device as claimed in claim 6, wherein the flow rate adjusting means includes a mechanism adapted to move the coil end cover in a direction away from the end portion of the coil thereby increasing the cross-sectional area of the flow path in accordance with a rotational speed of the motor.

8. The motor cooling device as claimed in claim 7, wherein said mechanism is adapted to move the coil end cover away from the end portion of the coil by a centrifugal force resulting from a rotation of the motor.

9. The motor cooling device as claimed in claim 1, wherein the flow rate adjusting means includes an electromagnetic force generating means that moves the coil end cover by an electromagnetic force thereby changing the cross-sectional area of the flow path.

10. The motor cooling device as claimed in claim 1, further comprising:
    a stator core on which the coil is formed; and
    a heat transfer means that connects the coil end cover with the stator core in a heat transmittable manner.

11. A motor cooling device, which is adapted to withdraw heat of a stator through fluid flowing around an end portion of a coil of the stator, comprising:
    a coil end cover that covers the end portion of the coil;
    a flow path for letting through heat transfer fluid, that is formed between an outer face of an end portion of the coil and an inner face of the coil end cover; and
    a flow rate adjusting device that changes a cross-sectional area of the flow path by moving the coil end cover toward the end portion of the coil or away from the end portion of the coil;
    wherein the flow rate adjusting device widens the cross-sectional area of the flow path an increment of the heat transfer fluid supplied to the flow path, and narrows the cross-sectional area of the flow path with a reduction of the heat transfer fluid supplied to the flow path.

* * * * *